United States Patent [19]

Frangou

[11] Patent Number: 4,675,358
[45] Date of Patent: Jun. 23, 1987

[54] COATING COMPOSITIONS

[75] Inventor: Andrew Frangou, Windlesham, United Kingdom

[73] Assignee: Imperial Chemical Industries PLC, London, England

[21] Appl. No.: 873,719

[22] Filed: Jun. 12, 1986

[30] Foreign Application Priority Data

Jun. 19, 1985 [GB] United Kingdom ................. 8515564

[51] Int. Cl.⁴ .............................................. C08K 3/08
[52] U.S. Cl. .................... 524/439; 524/440; 524/441; 524/547
[58] Field of Search ................ 523/402, 501; 524/439, 524/440, 441, 547; 106/14.12; 525/340

[56] References Cited

U.S. PATENT DOCUMENTS

| | | | |
|---|---|---|---|
| 3,055,865 | 9/1962 | Craig | 427/445 |
| 3,207,611 | 9/1965 | Ebren | 106/14.44 |
| 3,215,715 | 11/1965 | Wurstner | 252/389 |
| 3,276,916 | 10/1966 | Wurstner | 106/14.12 |
| 3,411,923 | 11/1968 | Bretz | 106/14.43 |
| 4,403,003 | 9/1983 | Backhouse | 427/407 |
| 4,484,951 | 11/1984 | Uehimura | 106/290 |

Primary Examiner—Lewis T. Jacobs
Attorney, Agent, or Firm—Cushman, Darby & Cushman

[57] ABSTRACT

The invention provides an aqueous coating composition which comprises a film forming polymer and a particulate metallic pigment characterized in that the composition contains as corrosion inhibition agent for the pigment a phosphatic material containing at least one acidic hydroxyl group or a salt thereof linked to a phosphorus atom and which has been obtained by the co-reaction of (i) an addition polymer carrying a functional hydroxyl group, (ii) a monohydric alcohol or phenol and (iii) a compound containing in the molecule the grouping:

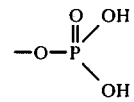

or a compound equivalent in structure to such a grouping. Preferably, where the reactant (i) and/or (ii) contains a material having a terminal alkyl group containing more than 6 carbon atoms such a material provides less than 25% by weight of the combined weights of the reactants (i) and (ii), since we have found that the presence of such long chain terminal groups impairs the inter coat adhesion between a base coat of the composition of the invention and a subsequently applied translucent top coat.

10 Claims, No Drawings

COATING COMPOSITIONS

The present invention relates to a coating composition, notably one containing metallic pigment particles.

It has been proposed to incorporate particulate metal pigments, notably powdered or flaked aluminium, into the so-called "metallic" paint compositions for use on steel or other metallic products, notably on automobile bodies, to provide a lustrous finish. Hitherto, such compositions have been solvent based. In order to reduce the problems associated with the use of volatile organic solvents, it has been proposed to use water as the carrier medium. However, the use of water introduces other problems in that the pigment reacts with the water to produce hydrogen. This problem is particularly acute where the composition is to be stored for prolonged periods in closed containers before use, as is customary with paints used in the automobile repair industry.

It has been proposed to treat metal surfaces with phosphoric acid or organic compounds thereof in order to provide a surface with reduced corrosion tendencies which can then be painted. Thus, U.S. Pat. Nos. 3,055,865, 3,207,611, 3,215,715, 3,276,916 and 3,411,923 describe the formation of adduct products of a polymer, an alcohol and phosphorus pentoxide, often in the form of metal complexes thereof and predominantly containing alkyl moieties, which are applied in solvent based compositions to metal surfaces to protect them from corrosion. It has also been proposed to incorporate some of those mixtures into solvent based paint compositions with the intention of providing corrosion resistant properties to the paint coating. Such compositions did not contain a metallic pigment and there was no suggestion that they could be used in water based compositions.

Surprisingly, we have found that certain types of phosphate esters are particularly effective for inhibiting corrosion of metallic pigments in aqueous based compositions. We have also found that where aqueous coating compositions containing such phosphate esters are used in base coat/top, clear coat combination coatings problems may arise due to impaired inter-coat adhesion. This we have found is due to the presence of excessive amounts of long chain aliphatic moieties in the phosphate ester corrosion inhibition agent and that this problem can be reduced by the use of materials having no more that a given maximum amount of such aliphaticmoieties.

Accordingly, the present invention provides an aqueous coating composition which comprises a film forming polymer and a particulate metallic pigment characterised in that the composition contains as corrosion inhibition agent for the pigment a phosphatic material containing at least one acidic hydroxyl group or a salt thereof linked to a phosphorus atom and which has been obtained by the co-reaction of (i) an addition polymer carrying functional hydroxyl group, (ii) a monohydric alcohol or phenol and (iii) a compound containing in the molecule the grouping:

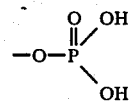

or a compound equivalent in structure to such a grouping. Preferably, where reactants (i) and/or (ii) are provided in part by compounds which contain a terminal alkyl group containing more than 6 carbon atoms, such a material is present in less than 25% by weight of the combined amounts of the reactants (i) and (iii) employed, since we have found that the presence of such long chain moieties reduces the inter-coat adhesion.

The invention also provides a pigment compositiion suitable for use in the compositions of the invention which comprises a metallic pigment admixed with a phosphatic corrosion inhibition agent as defined above. Preferably, the corrosion inhibition agent is present in an amount of from 0.5 to 230% by weight based on the weight of the pigment.

Addition polymers suitable for use as reagent (i) in the production of the corrosion inhibition agents for present use are typically polymers or copolymers of ethylenically unsaturated monomers carrying hydroxyl groups. Examples of suitable hydroxylic monomers include hydroxyethyl acrylate, hydroxyethyl methacrylate, hydroxyisopropyl acrylate, hydroxyisopropyl methacrylate, hydroxybutyl acrylate, hydroxybutyl methacrylate and allyl alcohol. The addition polymer (i) can be a homopolymer of one of these hydroxylic monomers. However, it is preferred that it be a copolymer of one or more such monomers with at least one other ethylenically unsaturated monomer which does not carry a hydroxyl group. Examples of these other monomers include methyl methacrylate, ethyl acrylate, butyl acrylate, isobornyl methacrylate, stryrene, vinyltoluene and vinyl acetate.

Preferred addition polymers (i) are copolymers of styrene and allyl alcohol. Particularly preferred polymers are styrene/allyl alcohol copolymers of molecular weight in the range 1000–2000. Typical of such polymers are those sold by Monsanto Chemical Co. under the designation "RJ 100" and "RJ 101".

Suitable monohydric alcohols for present use include methanol, ethanol, propanol, isopropanol, butanol, isobutanol, lauryl alcohol and cetyl alcohol. Suitable monohydric phenols include phenol, o-, m- and p-cresol and p-nonylphenol, notably p-tert-amylphenol; and alkaryl alkanols, for example benzyl alcohol and alkyl derivatives thereof. Thus, suitable compounds for use as reagent (ii) include those of the general formula $HO-R_n-X_m-R'_p$ wherein R is a straight or branched alkylene chain, X is an aromatic nucleus, R' is hydrogen or a straight or branched chain alkyl group, and n and m have values of 0 or 1, the sum of n and m being at least 1, and p has a value of 0, 1 or more when R' is hydrogen or alkyl or p has a value of 0 when R' is alkyl. It is within the scope of the present invention to employ the reagents (ii) in the form of the epoxides thereof rather than the free alcohol and the term alkanol is used herein to denote the epoxide thereof wherever the context permits.

The compound (iii), which is capable of reacting with the hydroxyl groups in the reactants (i) and (ii) is preferably selected from orthophosphoric acid, $H_3PO_4$, phosphorus pentoxide $P_2O_5$. However, other phosphorus compounds which contain the grouping $-O-PO(OH)_2$ are suitable, for example pyrophosphoric acid, $H_4P_2O_7$.

We have found that the efficacy of the phosphatic corrosion inhibition agents in inhibiting reaction of the metallic pigment tends to improve when either or both of the reactants (i) or (ii) incorporates an aliphatic chain of four or more carbon atoms. Thus, in the case where the reactant (i) is one of the preferred styrene/allyl alcohol copolymers, a progressive improvement is observed through the series ethyl alcohol/tert-amylphenol/lauryl alcohol/cetyl alcohol as the reactant (ii). Where, however, the composition of the invention is to be used to form a base coat over which a transparent top coat composition is to be applied, we have found that the presence of terminal long chain aliphatic moieties on the phosphatic material surprisingly reduces the adhesion of the top coat to the base coat. It is therefore preferred that the proportion of long aliphatic chains present as terminal groups should be limited. Thus, it is preferred that where reactant (i) or the alcohol and/or phenol used in the preparation of the phosphatic material has terminal aliphatic groups containing more than 6 carbon atoms the material providing such groups should not constitute more than 25% of the combined weights of reactants (i) and (ii).

The relative proportions in which the reactants (i), (ii) and (iii) are reacted together to produce the phosphatic corrosion inhibition agents for present use may vary considerably and the phosphatic products obtained are complex mixtures of different phosphate ester species. This mixture may be used as such without isolation of any one species from the mixture. In order to minimise the production of undesirable crosslinked or gelled products, the monofunctional reactant (ii) should desirably be employed in a proportion sufficient for it to act as an effective chain terminator. Thus, it is preferred to use from 0.1 to 1.8, notably about 1.0, moles of the monohydroxy reactant (ii) for every atom of phosphorus in the reactant (iii). It is desirable that the ratio of total hydroxyl groups contributed by reactants (i) and (ii) to the actual or potential P—OH groups derived from reactant (iii) should be such that the product has an acid value titrated to a phenolphthalein end point in the range 25–400 mg KOH/g, preferably 40–200 mg KOH/g, notably 75–150 mg KOH/g. The optimum relative proportions of the reagents and reaction conditions are readily established for each individual case by simple experiment. For example, effective phosphatic corrosion inhibition agents for present use may be obtained by reacting together approximately 1 mole of a styrene/allyl alcohol copolymer containing on average about 5 hydroxyl groups per molecule, approximately 3 moles of a monohydric alcohol or phenol and approximately 1.5 moles of phosphorus pentoxide or 3 moles of orthophosphoric acid, the reaction being carried out at a temperature in the range 80° to 150° C. and continued so as to achieve a final acid value in the range 75–150 mg KOH/g. The co-reaction of reagents (i), (ii) and (iii) is normally carried out at temperatures between ambient and about 150° C., preferably in the range 80°–150° C. and preferably under reflux.

The reaction may be carried out in the presence or absence of an inert solvent, as desired; the use of a solvent being particularly advantageous when the reactant (iii) is a solid, as for example when phosphorus pentoxide or orthophosphoric acid are used. Suitable solvents include hydrocarbons such as toluene, xylene, and ethyl benzene. Conveniently the solvent has a boiling point close to the chosen reaction temperature, so that the reaction can be carried under reflux. It is also preferred that the reactants (i) and (ii) be mixed prior to addition of reactant (iii).

The immediate products of the co-reaction of the reactants (i), (ii) and (iii), contain free P—OH groups and have a positive acid value. They may be used directly as the corrosion inhibition agent in the compositions of the invention, provided that the other components of the compositions are not susceptible to acidic conditions. However, it is usually preferred to employ the corrosion inhibition agent in the form of a salt thereof, for example that obtained by neutralising the reaction product with ammonia or an amine, eg. dimethylamine, triethylamine or ethanolamine. It may also be desired to admix the reaction mixture with a co-solvent, for example an alcohol, to reduce the residual solids content thereof.

The metallic pigment for present use may be selected from a wide range of conventional pigments, notably those containing aluminium, copper, zinc, brass, nickel, aluminium-copper alloy, aluminium-zinc alloy, aluminium-nickel alloy and aluminium-magnesium alloy. The pigment can be in the form of a powder or, preferably, a flake; notably aluminium flake. The metal flakes typically have a thickness in the range 0.01 to 5 μm and length or width in the range 1 to 50 μm.

The film forming polymer for present use can be selected from the wide range of such polmers used in the coating field, eg. addition polymers of the acrylic type, which are either dissolved or dispersed in the aqueous phase. If desired, the polymers can be solubilised by the neutralisation of acidic groups with ammonia or an amine. Alternatively, the polymer can be a condensation polymer, e.g. a polyester or alkyd resin, which can also be neutralised with ammonia or an amine, if desired. Preferably, the polymers for present use are in the form of an aqueous dispersion which is sterically stabilised in known manner and are plastically stable at low shear so that compositions containing the dispersions can be applied by spray application techniques. Furthermore, the polymers for use in the present invention may be produced as aqueous dispersions which already contain some of the other ingredients which it is desired to have present in the compositions of the invention, for example amines to neutralise the resins, additives to render the dispersions sterically stable and flow improving agents such as polypropylene glycols. The film forming polymers may be used in the present invention in the form of such dispersions.

The composition of the invention may contain other components, for example non-metallic pigments or colouring agents, cross-linking agents, thickeners and fillers, and flow improvers such as polypropylene glycols, normally used in formulating aqueous coating compositions. The composition preferably also contains a co-solvent for the phosphatic material. Suitable co-solvents are water miscible or soluble and include mono- or dihydric alcohols, notably ether glycols such as polyethylene glycol and straight or branched ether alcohols, such as butoxy ethanol. The co-solvent typically provides from 2 to 30% of the carrier medium.

The compositions of the invention are aqueous dispersions of the polymers and pigment in an aqueous carrier medium and are suitable for application by spraying techniques and the relative proportions of the ingredients for any given case can readily be determined. Typically, the compositions comprise up to 10% w/w pigment, up to 25% w/w polymer and have a solids content of up to 30% w/w; contain up to 5% w/w of the phosphatic corrosion inhibitor; up to 15% w/w of co-solvent; up to 80% w/w water; and up to 10% w/w other components, such as cross-linking agents and flow improvers; all the above percentages being based on the total composition. It is preferred to use the phosphatic corrosion inhibition agent in an amount which, on the basis of its acid value as determined by titration with potassium hydroxide to a phenolphthalein end point, is equivalent to from 0.2% to 5%, preferably from 0.5 to 2%, of orthophosphoric acid on the amount of metallic pigment present. The formulation and preparation of water based metallic paint compositions is described in detail in our Co-pending British patent application No. 2073690A.

The compositions of the invention are typically made by admixing the desired proportions of the various components in a fluid medium, for example in the dispersion of the film forming polymer. If desired, some of the components can be pre-mixed, as will usually be the case with dispersion of the film forming polymer. Thus, the metallic pigment can be admixed with the phosphatic corrosion inhibition agent prior to incorporation of either of these into the coating compositon. For example, the inhibition agent can be added as a solution or dispersion to a pigment paste as commercially available. Alternatively, the inhibition agent may be added during production of the pigment; for example between the steps of hammer-milling the metallic pigment and its re-incorporation into white spirit or other organic medium. However, it is preferred to introduce the inhibition agent as a further ingredient during the formulation of the water-borne coating composition, e.g. during the blending of the film-forming resin, the metallic pigment and the aqueous medium, together with other ingredients. Preferably, the phosphatic corrosion inhibition agent is added after some initial dispersion and de-agglomeration of the metallic pigment in the aqueous polymer dispersion has taken place.

The compositions of the invention find use wherever it is desired to apply a lustrous coating to a substrate and reduce the problems associated with the use of volatile solvents as the carrier medium for the composition. The invention is of especial use in the spray coating of metals, notably in the manufacture or repair of automobile bodies and components. The invention is of especial use in the application of a pigmented base coat followed by the application of a clear top coat, since the preferred compositions of the invention reduce the problems of inter-coat adhesion between the base and top coats encountered with compositions containing long chain terminal alkyl moieties.

The invention will now be illustrated by the following Examples in which all parts and percentages are given by weight.

EXAMPLE 1

A. Preparation of Inhibiting Agents:

In a reaction vessel fitted with stirrer, thermometer, reflux condenser and Dean and Stark separator, a mixture of a 2.23:1 styrene/allyl alcohol copolymer of mol.wt. 1600 (234.7 parts, 1 mole), p-tert-amylphenol (72.2 parts, 3 moles) and xylene (350.0 parts) was stirred and heated at 85°–90° C. until the solid constituents had dissolved. There was then added 100% phosphoric acid (43.1 parts, 3 moles) and the temperature was raised to that of reflux of the diluent (140°–143° C.) After 2.75 hours at that temperature, 11.6 g of water had been removed and the phosphate ester product had a measured acid value of 94 mg KOH/g (non-volatile).

The cold reaction product (64.0 parts) was stirred with 2-butoxyethanol (30.0 parts) until the solution was homogeneous and the pH was then adjusted to a value of 7.60 by addition of triethylamine (4.9 parts) with continued stirring. A further 1.14 parts of 2-butoxyethanol was added, giving a final non-volatile content of the solution of inhibiting agent of 33.0%.

B. Preparation of Paint Composition

The following ingredients were blended together:

| | |
|---|---:|
| Aluminium flake pigment, 65% paste: | 25.4 parts |
| 2-Butoxyethanol | 25.0 parts |
| Low molecular weight melamine/formaldehyde resin ("Cymel" 325*) | 22.5 parts |
| Polypropylene glycol, mol. wt. 440 | 12.0 parts |

*"Cymel" is a Registered Trade Mark.

The blend was stirred until the aluminium flake pigment was fully and uniformly dispersed. There was then added dropwise to the blend the neutralised solution of inhibiting agent, as prepared in part (A) above (11.2 parts). When this had dispersed throughout the blend, there was gradually added with stirring 382.3 parts of an aqueous latex of an acrylic resin having an acid value of 26 mg KOH/g and neutralised with triethylamine, the latex having a solids content of 18%.

To the resulting mixture there were added, in the following order:

| | |
|---|---:|
| Dimethylaminoethanol, 10% aqueous solution | 8.8 parts |
| Demineralised water | 52.9 parts |
| 2-Butoxyethanol | 2.8 parts |
| Demineralised water | 20.5 parts |

The resulting paint composition had a solids content of 16.0%, a co-solvent content of 12.0% and a pH of 7.6.

C. Testing of the Paint composition (i) Testing for Inhibition of Gassing

A sample of the paint composition prepared in (B) was stored at 40° C. with provision for measuring the relative amount of gas evolved. The results are shown in the Table below.

A sample of the same paint composition from which the inhibiting agent had been omitted gassed violently at 40° C. and the aluminium flake was rapidly and completely converted to the oxide.

(ii) Testing for Properties of Paint Film

The paint composition prepared in (B) was applied by spray to steel panels which had previously been coated with surfacer and stoved; the amount of paint applied was such as to give a final stoved film thickness of 12–15 microns. The film was dried by blowing with compressed air and there was then applied to it a further coating, of thickness 37–45 microns, of a solvent borne acrylic thermosetting clearcoat. After a 15-minute flash-off at ambient temperature, the panels were stoved at 130° C. for 30 minutes. When cool, one of the panels was submitted to a chip-resistance test. This was a modification of the test of B.S. 148:Part 15:1069, using 450 g of 5 mm-diameter steel balls instead of 100 ¼-inch hexagon nuts as specified. The panel was supported at an angle of 45°, with the painted side uppermost, below and at a distance (measured to the centre of the panel) of 100 mm from the lower end of a vertical pipe 4.5 m in length and 50 mm in internal diameter. The pipe had a slide closure 50 mm from its upper end; the steel balls were introduced into the pipe above the slide and the latter was then sharply withdrawn, allowing the balls to fall on to the panel. Damage to the paint film was assessed and rated according to B.S. 148, as follows:
1=very slight
2=slight
3=moderate
4=considerable
5=severe
6=very severe Another of the panels was subjected to the crosscut tape test (cross-hatch test), ASTM 3359-78. The area of paint film removed from the sample was estimated as a percentage of the toatal hatched area. The results of these two tests are shown in the Table below.

EXAMPLE 2

A. Preparation of Inhibiting Agent

A mixture of a 1.57:1 styrene/allyl alcohol copolymer of mol.wt. 1150 (104.7 parts, 1.0 mole), p-tert-amylphenol (44.5 parts, 3 moles) and xylene (168.6 parts) was stirred and heated at 85°–90° C. in the apparatus described in Example 1, part A, until the solid constituents had dissolved. There was then added phosphorus pentoxide (19.4 parts, 1.5 moles) together with further xylene (20 parts) and the temperature was raised to that of reflux of the diluent (140°–143° C.). After 3 hours, 1.2 parts of water had been removed. The reaction mixture was then stripped under vacuum over 30 minutes to remove xylene (132 parts); this was replaced by isobutanol (90.8 parts) added over 10 minutes. The solution of inhibiting agent thus obtained had an acid value of 114 mg KOH/g (non-volatile).

The cold solution (56.6 parts) was stirred with 2-butoxyethanol (35.0 parts) until the mixture was homogeneous, and the pH was adjusted to a value of 7.6 by addition of triethylamine (5.5 parts). A further addition of 2-butoxyethanol gave a solution of final non-volatile content of 32.8%.

B. Preparation of Paint Composition

The general procedure described in part (B) of Example 1 was repeated, with the following differences: (a) the amount of 2-butoxyethanol in the initial blend was increased to 26.3 parts; (b) the 11.2 parts of the neutralised solution of inhibiting agent of Example 1(A) was replaced by 9.3 parts of the neutralised solution prepared as in (A) above; (c) the amounts of further additions were, in the order given, dimethylaminoethanol (1=% aqueous solution) 8.0 parts, demineralised water 43.8 parts, 2-butoxyethanol 3.0 parts, and further demineralised water 21.6 parts. The resulting paint composition had a solids content of 15.6%, a co-solvent content of 11.6% and a pH value of 7.6.

C. Testing of the Paint Composition

The paint composition prepared as in (B) above was tested for inhibition of gassing and for paint film properties as described in part (C) of Example 1. The results are shown in the Table below.

EXAMPLE 3

A. Preparation of Inhibiting Agent

A mixture of the styrene/allyl alcohol copolymer used in Example 1(A) (287.0 parts, 1 mole), ethanol (24.8 parts 3 moles) and xylene (350 parts) was stirred and heated at about 90° C. in the apparatus described in Example 1(A) until the polymer had dissolved. The solution was cooled to 52° C. and a suspension of phosphorus pentoxide (38.2 parts, 1.5 moles) in xylene (100 parts) was added. After the initial exothermic reaction had subsided, the temperature was raised to 140–145 for 3½ hours, during which time 20 parts of water were removed. The phosphate ester product had an acid value of 144 mg KOH/g non-volatile.

The cold reaction product (60.1 parts) was stirred with 2-butoxyethanol (32.0 parts) until the mixture was homogeneous; the pH of the solution was then adjusted to 7.6 by addition with stirring of triethylamine (5.0 parts). After a further addition of 2-butoxyethanol (2.9 parts) the solution had a solids content of 31.4%.

B. Preparation of Paint Composition

The general procedure described in part (B) of Example 1 was repeated, with the following differences: (a) the amount of 2-butoxyethanol in the initial blend was increased to 27.1 parts; (b) the 11.2 parts of the neutralised solution of inhibiting agent of Example 1(A) was replaced by 7.7 parts of the neutralised solution prepared as in (A) above; (c) the amounts of further additions were, in the order given, dimethylaminoethanol (10% aqueous solution) 8.1 parts, demineralised water 24.3 parts, 2-butoxyethanol 3.3 parts and demineralised water 21.6 parts. The resulting paint composition had a solids content of 16.0%, a co-solvent content of 12.0% and a pH of 7.6.

C. Testing of the Paint Composition

The paint composition prepared as in (B) above was tested for inhibition of gassing and for paint film properties as described in part (c) of Example 1. The results are shown in the Table below.

EXAMPLE 4

A. Preparation of Inhibiting Agent

A mixture of the styrene/allyl alcohol copolymer used in Example 1(A) (243.3 parts, 1 mole), lauryl alcohol (84.8 parts, 3 moles) and xylene (339.5 parts) was stirred and heated at about 60° C. in the apparatus described in Example 1(A) until the polymer had dissolved. There was then added phosphorus pentoxide (32.4 parts, 1.5 moles) and the temperature was raised to 140°–143° C. for 3 hours, during which time 3.0 parts of water were removed. The phosphate ester product had an acid value of 117 mg KOH/g non-volatile.

The cold reaction product (67.4 parts) was stirred with 2-butoxyethanol (26.0 parts) until the mixture was homogeneous. The pH of the solution was then adjusted to 7.6 by addition with stirring of triethylamine (3.7 parts). Further 2-butoxyethanol (2.9 parts) was added, giving a final solution of solids content 30.7%.

B. Preparation of Paint Composition

The general procedure described in part (B) of Example 1 was repeated, with the following differences; (a) the amount of 2-butoxyethanol in the initial blend was 25.7 parts; (b) the 11.2 parts of the neutralised solution of inhibiting agent of Example 1(A) were replaced by 9.7 parts of the neutralised solution prepared as in (A) above; (c) the amounts of further additions were, in the order given, dimethylaminoethanol (10% aqueous solution) 7.3 parts, demineralised water 45.6 parts, 2-butoxyethanol 3.0 parts and demineralised water 22.0 parts. The resulting paint composition had a solids content of 16.3% a co-solvent content of 11.9% and a pH of 7.6.

c. Testing of the Paint Composition

The paint compositon prepared as in (B) above was tested for inhibition of gassing and for paint film properties as describved in part (C) of Example 1. The results are shown in the Table below.

EXAMPLE 5

A. Preparation of Inhibiting Agent

A mixture of the styrene/allyl alcohol copolymer used in Example 1(A) (220.5 parts, 1.0 mole), cetyl alcohol (100.1 parts, 3 moles) and xylene (300 paarts) was stirred and heated at about 80° C. in the apparatus described in Example 1(A) until the polymer had dissolved. There was then added phosphorus pentoxide (29.4 parts, 1.5 moles) suspended in xylene (50 parts) and the temperature was raised to 140°-143° C. for about 3 hours. The phosphate ester product had an acid value of 110 mg KOH/g non-volatile.

The cold reaction product (67.1 parts) was stirred with n-butanol (26.0 parts) until the mixture was homogeneous; the pH of the solution was then adjusted to 7.6 by addition with stirring of triethylamine (4.1 parts). Further n-butanol (2.8 parts) was added to give a final solution content 33.1%.

B. Preparation of Paint Composition

The general procedure described in part (B) of Example 1 was repeated, with the following differences: (a) the amount of 2-butoxyethanol in the initial blend was 26.0 parts; (b) the 11.2 parts of the neutralised solution of inhibiting agent of Example 1(A) were replaced by 9.6 parts of the neutralised solution prepared as in (A) above; (c) the amounts of further additions were, in the order given, dimethylaminoethanol (10% aqueous solution) 7.0 parts, demineralised water 77.1 parts, 2-butoxyethanol 2.5 parts and demineralised water 18.0 parts. The resulting paint compositon had a solids content of 16.0%, a co-solvent content of 12.0% and a pH of 7.6.

C. Testing of the Paint Composition

The paint composition prepared as in (B) above was tested for inhibition of gassing and for paint film properties as described in part (C) of Example 1. The results are shown in the Table below.

EXAMPLE 6

A. Preparation of Inhibiting Agent

A mixture of the styrene/allyl alcohol copolymer used in Example 1(A) (243.3 parts, 1 mole), p-tert-amylphenol (74.3 parts, 3 moles) and xylene (350 parts) was stirred and heated at about 90° C. in the apparatus described in Example 1(A) until the solid constituents had dissolved. The solution was cooled to 52° C. and phosphorus pentoxide (32.4 parts, 1.5 moles) was added. After the initial exothermic reaction had subsided, the temperature was raised to 140°-145° C. for 5 hours, during which time 3.5 parts of water were removed. Over a further period of 2 hours, xylene (305 parts) was stripped off, the temperature rising to 150° C. After the reaction mixture had cooled to 105° C., isobutanol (188 parts) was added over 5 minutes, following by stirring at 100° C. for 1 hour. The homogeneous phosphate ester product had an acid value of 100.5 mg KOH/g non-volatile.

The cold reaction product (55.9 parts) was stirred with 2-butoxyethanol (36.0 parts) until the mixture was homogeneous; the pH of the solution was then adjusted to 7.6 by addition with stirring of triethylamine (5.8 parts). After a further additon of 2-butoxyethanol (2.3 parts) the solution had a solids content of 35.7%.

B. Preparation of Paint Composition

The general procedure described in part (B) of Example 1 was repeated with the following differences: (a) the amount of 2-butoxyethanol in the initial blend was increased to 25.6 parts; (b) the 11.2 parts of the neutralised solution of inhibiting agent of Example 1(A) was replaced by 8.8 parts of the neutralised solution prepared as in (A) above; (c) the amounts of further additions were, in the order given, dimethylaminoethanol (10% aqueous solution) 6.0 parts, demineralised water 61.7 parts, 2-butoxyethanol, 2.6 parts and demineralised water 18.8 parts. The resulting paint composition had a solids content of 16.0%, a co-solvent content of 12.0% and a pH of 7.5.

C. Testing of the Paint Composition

The paint composition prepared as in (B) above was tested for inhibition of gassing and for paint film properties as described in part (C) of Example 1. The results are shown in the Table below.

EXAMPLE 7

A. Preparation of Inhibiting Agent (i) To a charge of xylene (36.9 parts) held under nitrogen and at a temperature of 137° C. (reflux), there was fed a mixture of isobornyl methacrylate (19.4 parts), butyl methacrylate (22.2 parts), methyl methacrylate (5.6 parts), styrene (5.6 parts), hydroxybutyl acrylate (28.0 parts) and tert-butyl perbenzoate (1.7 parts); the addition occupied 3 hours. After a further addition of tert-butyl perbenzoate (1.0 part), the solution was held at 140° C. for 1½ hours to complete polymerisation.

(ii) The polymer solution from stage (i) (376.0 parts), ethanol (1.8 parts) and phosphorus pentoxide (5.5 parts) were mixed at room temperature (25° C.) and then heated until refluxing commenced; the mixture was held at that temperature (142° C.) for a total of 9 hours. The phosphate ester product had an acid value of 88 mg KOH/g non-volatile.

(iii) The cold reaction product (52.5 parts) was stirred with 2-butoxyethanol (43.0 parts) until the mixture was homogeneous. The pH of the solution was then adjusted to 7.66 by addition with stirring of triethylamine (2.3 parts). After a further addition of 2-butoxyethanol (2.2 parts), the solution had a solids contents of 27.9%.

B. Preparation of the Paint Composition

The general procedure described in part (B) of Example 1 was repeated, with the following differences: (a) the amount of 2-butoxyethanol in the initial blend was reduced to 22.1 parts, (b) the 11.2 parts of the neutralised solution of inhibiting agent of Example 1(A) was replaced by 14.1 parts of the neutralising solution prepared as in (A) above; (c) the amounts of further additionals were, in the order given, dimethylaminoethanol (10% aqueous solution) 7.2 parts, demineralised water 48.9 parts, 2-butoxyethanol 2.9 parts, and demineralised water 21.1 parts. The resulting paint composition had a solids content of 16.0%, a co-solvent content of 12.0% and a pH of 7.6.

C. Testing of the Paint Composition

The paint composition prepared as in (B) above was tested for inhibition of gassing and for paint film properties as described in paart (C) of Example 1. The results are shown in the Table below.

| Example No: | Gassing Test: ml. gas evolved per 100 g of paint+ | | Crosshatch test: % of paint film removed | Chip resistance test rating |
|---|---|---|---|---|
| | 7 days | 21 days | | |
| 1 | 0.4 | 1.1 | 2 | 1 |
| 2 | 0 | 0 | 2 | 1 |
| 3 | 1.1 | 2.4 | 1 | 1 |
| 4 | 1.0 | 1.2 | 50 | 3 |
| 5 | 0 | 0 | —* | —* |
| 6 | 0.7 | 1.8 | 0 | 1 |
| 7 | 2.4 | 10.2 | 2 | 1 |

+Throughout the duration of all the gassing tests, there was no significant change in the appearance of the aluminium flake.
*In this Example, the adhesion of the clearcoat to the basecoat was insufficient for meaningful results to be obtained in the cross-hatch and chip resistance results.

We claim:

1. An aqueous coating composition which comprises a film forming polymer and a particulate metallic pigment which composition contains as corrosion inhibition agent for the pigment a phosphatic material containing at least one acidic hydroxyl group linked to a phosphorus atom and which has been obtained by the co-reaction of (i) an addition polymer carrying a functional hydroxyl group, (ii) a monohydric compound selectd from an alcohol and a phenol and (iii) a compound selected from those containing in the molecule the grouping:

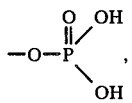

anhydrides and salts thereof.

2. A composition as claimed in claim 1 wherein the phosphatic material is used in the form of a salt thereof.

3. A composition as claimed in claim 1 wherein where the material selected from reactant (i) and (ii) contains a terminal alkyl group containing more than 6 carbon atoms, such a material is used in an amount of less than 25% by weight of the combined total of reactants (i) and (ii).

4. A composition as claimed in claim 1 wherein the reactant (iii) is selected from orthophosphoric acid, a salt thereof and phosphorus pentoxide.

5. A composition as claimed in claim 1 wherein the phosphatic material has an acid value of from 25 to 400 mg KOH/g.

6. A composition as claimed in claim 1 wherein the phosphatic material is present in an amount of from 0.2 to 5% by weight based on the metallic pigment, expressed as equivalents of orthophosphoric acid based on the acid value of the phosphatic material determined by titration with potassium hydroxide using a phenolphthalein end point.

7. A composition as claimed in claim 1 in the form of an aqueous dispersion comprising a sterically stabilised film forming polymer, a metallic flake pigment and as corrosion inhibition agent for the pigment the product of the co-reaction of: (i) a polymer selected from an addition homopolymer of an ethylenically unsaturated monomer carrying hydroxyl groups and from copolymers of such monomers with ethylenically unsaturated monomers not carrying hydroxyl groups; (ii) a monohydric compound of the formula HO—$R_n$—$X_m$—$R'_p$ wherein R is a straight or branched alkylene chain, X is a phenyl group, R' is hydrogen or a straight or branched alkyl group, n and m have values of 0 or 1 and the sum of n and m is at least 1 and p has a value of at least 1 when R' is hydrogen or alkyl or has a value of 0 when R' is alkyl; and (iii) a compound selected from orthophosphoric acid, a salt thereof and phosphorus pentoxide, not more than 25% w/w of the combined weights of reactants (i) and (ii) being a compound HO—$R_n$—$X_m$—$R'_p$ having R' as an alkyl group containing more than 6 carbon atoms or a reactant (i) having a terminal alkyl group containing more than 6 carbon atoms.

8. A composition as claimed in claim 7 wherein the said reactant (i) is a styrene/allyl alcohol copolymer.

9. A composition as claimed in claim 7 wherein said reactant (ii) is p-tert-amylphenol.

10. A pigment composition suitable for use in the composition of claim 1 which comprises a metallic pigment in admixture with as a corrosion inhibition agent for the pigment a phosphatic material containing at least one acidic hydroxyl group linked to a phosphorus atom or a salt thereof which phosphatic material has been obtained by the co-reaction of (i) an addition polymer carrying a functional hydroxyl group, (ii) a monohydric compound selected from an alcohol and a phenol and (iii) a compound selected from those containing in the molecule the grouping:

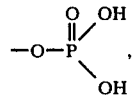

anhydrides and salts thereof.

* * * * *